(12) United States Patent
Lai et al.

(10) Patent No.: US 11,437,162 B2
(45) Date of Patent: Sep. 6, 2022

(54) CONDUCTIVE MATERIAL COMPOSITION AND CONDUCTIVE MATERIAL PREPARED THEREFROM

(71) Applicant: INDUSTRIAL TECHNOLOGY RESEARCH INSTITUTE, Hsinchu (TW)

(72) Inventors: Ying-Xuan Lai, Nantou (TW); Shou-Yi Ho, Taoyuan (TW); Yi-Chi Yang, New Taipei (TW); Yen-Chun Liu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 200 days.

(21) Appl. No.: 16/731,680

(22) Filed: Dec. 31, 2019

(65) Prior Publication Data

US 2021/0202126 A1    Jul. 1, 2021

(51) Int. Cl.
*H01B 1/22* (2006.01)
*C08K 3/08* (2006.01)
*C08L 81/04* (2006.01)
*B82Y 30/00* (2011.01)

(52) U.S. Cl.
CPC .............. *H01B 1/22* (2013.01); *C08K 3/08* (2013.01); *C08L 81/04* (2013.01); *B82Y 30/00* (2013.01); *C08K 2003/0806* (2013.01); *C08K 2201/001* (2013.01); *C08K 2201/003* (2013.01); *C08K 2201/011* (2013.01)

(58) Field of Classification Search
CPC . H01B 1/22; B82Y 30/00; C08K 3/08; C08K 7/06; C08K 7/24; C08K 2201/001; C08K 2201/003; C08K 2201/004; C08K 2201/011; C08K 2003/0806
USPC ............................. 252/503, 506, 510, 511
See application file for complete search history.

(56) References Cited

U.S. PATENT DOCUMENTS

| | | |
|---|---|---|
| 3,882,091 A | 5/1975 | Villa |
| 4,565,854 A | 1/1986 | Sato et al. |
| 5,610,243 A | 3/1997 | Vietti et al. |
| 5,665,797 A | 9/1997 | Tahara et al. |
| 6,080,336 A | 6/2000 | Suehiro et al. |
| 7,087,304 B1 | 8/2006 | Woods et al. |
| 8,623,512 B2 | 1/2014 | Pyun et al. |
| 8,680,214 B2 | 3/2014 | Hobbs et al. |
| 8,710,159 B2 | 4/2014 | Blackford et al. |
| 9,080,004 B2 | 7/2015 | Abrami et al. |
| 9,253,911 B2 | 2/2016 | Tsukao et al. |
| 9,725,556 B2 | 8/2017 | Cai et al. |
| 9,761,349 B2 | 9/2017 | Imahashi |
| 9,920,006 B2 | 3/2018 | Cui et al. |
| 10,179,766 B2 | 1/2019 | Echigoya et al. |
| 10,266,730 B2 | 4/2019 | Furusho et al. |
| 10,301,488 B2 | 5/2019 | Okamoto et al. |
| 2009/0304956 A1 | 12/2009 | Probster et al. |
| 2016/0372230 A1* | 12/2016 | Imahashi ................. C08K 3/08 |
| 2018/0044570 A1 | 2/2018 | Fernandez et al. |

FOREIGN PATENT DOCUMENTS

| | | | |
|---|---|---|---|
| CA | 2299353 A1 * | 2/2000 | ............... C08J 9/28 |
| CA | 3 042 048 A1 | 5/2018 | |
| CN | 1292403 A | 4/2001 | |
| CN | 1643022 A | 7/2005 | |
| CN | 100363401 C | 1/2008 | |
| CN | 100408568 C | 8/2008 | |
| CN | 103135352 A | 6/2013 | |
| CN | 104119499 B | 3/2016 | |
| CN | 105378854 A | 3/2016 | |
| CN | 103145989 B | 12/2016 | |
| CN | 104558584 B | 2/2017 | |
| CN | 104448314 B | 7/2017 | |
| CN | 107142054 A | 9/2017 | |
| CN | 107205677 A | 9/2017 | |
| CN | 108893078 A * | 11/2018 | ............... C09J 4/06 |
| EP | 0 424 143 A2 | 4/1991 | |
| EP | 0 738 742 A1 | 10/1996 | |
| JP | 2006-89658 A | 4/2006 | |
| JP | 3785519 B2 | 6/2006 | |
| JP | 2006-225616 A | 8/2006 | |
| JP | 3941033 B2 | 7/2007 | |
| JP | 2010-57160 A | 3/2010 | |
| JP | 2010-116452 A | 5/2010 | |
| JP | 2010-280881 A | 12/2010 | |
| JP | 2011-127059 A | 6/2011 | |
| JP | 2012-182184 A | 9/2012 | |
| JP | 2012182184 A * | 9/2012 | ............. H01L 24/29 |
| JP | 5493816 B2 | 5/2014 | |
| JP | 6054524 B2 | 12/2016 | |
| TW | 554349 B | 9/2003 | |
| TW | 200745302 A | 12/2007 | |
| WO | WO 2018/085650 A1 | 5/2018 | |
| WO | WO2018/131381 A1 | 11/2019 | |

OTHER PUBLICATIONS

Taiwanese Office Action and Search Report for Taiwanese Application No. 108148581, dated Jan. 11, 2020.
Chinese Office Action and Search Report for Chinese Application No. 201911420798.4, dated Apr. 8, 2022.

\* cited by examiner

*Primary Examiner* — Tri V Nguyen
(74) *Attorney, Agent, or Firm* — Birch, Stewart, Kolasch & Birch, LLP

(57) ABSTRACT

A conductive material composition and a conductive material prepared therefrom are provided. The conductive material composition includes 40-80 parts by weight of disulfide resin having at least one terminal reactive functional group and 20-60 parts by weight of metal material. The terminal reactive functional group is independently acrylate group, methacrylate group, glycidyl group, oxiranyl group, oxetanyl group, or 3,4-epoxycyclohexyl group.

14 Claims, No Drawings

CONDUCTIVE MATERIAL COMPOSITION AND CONDUCTIVE MATERIAL PREPARED THEREFROM

TECHNICAL FIELD

The disclosure relates to a conductive material composition and a conductive material prepared therefrom.

BACKGROUND

In the textile industry, conductive fibers are critical materials for manufacturing smart textiles and wearable devices. Conventional conductive fibers are mainly metal fibers with strength and rigidity but without elasticity and stretchability, so they are not comfortable to wear.

Generally, carbon black and a resin material are mixed and extruded in order to give the resin conductive properties. However, more carbon black (higher than 50%) needs to be added using this method, meaning that the strength of the material can be reduced by the addition of too much carbon black. In addition, it is difficult to improve conductivity. This is because of phase separation that can easily occur due to poor compatibility between carbon black and resin. Alternatively, a conductive agent (such as metal particles) is mixed with resin to impart conductivity to the material, but its processability and conductivity are relatively poor.

In addition, since the conventional conductive agent itself is not stretchable, the electrical properties of the conductive material are greatly changed when the conductive material is stretched. In order to improve the stretchability of the conductive material, the industry provides a conductive material with a specific conductive circuit structure design. However, the conductive material is restricted to being stretchable in only one direction, and the process for the conductive material is complicated.

Therefore, a novel conductive material is called for to solve the problems in the prior art.

SUMMARY

According to embodiments of the disclosure, the disclosure provides a conductive material composition, including: 40 to 80 parts by weight of disulfide resin having at least one terminal reactive functional group, wherein the terminal reactive functional group is acrylate group, methacrylate group, glycidyl group, oxiranyl group, oxetanyl group, or 3,4-epoxycyclohexyl group; and 20 to 60 parts by weight of metal material, wherein the metal material includes a one-dimensional metal material.

According to embodiments of the disclosure, the disclosure provides a conductive material being a curing product of the conductive material composition of the disclosure.

A detailed description is given in the following embodiments with reference to the accompanying drawings.

DETAILED DESCRIPTION

The conductive material composition and the conductive material prepared therefrom of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

The disclosure provides a conductive material composition. According to embodiments of the disclosure, the conductive material composition may include a disulfide resin having at least one terminal reactive functional group and metal material (e.g. one-dimensional metal material). The disulfide resin having at least one terminal reactive functional group may bond to the metal material through the disulfide bonding group, such that the disulfide resin may wrap the metal material. As such, the hydrophilic one-dimensional metal material (e.g. silver nanowire) could be evenly dispersed into the resin of organic phase. In addition, the disulfide resin having at least one terminal functional group may react with other resin component and accelerate the curing rate of the conductive material composition. As such, the conductive material formed of the curing product of the conductive composition in the disclosure has stretchability and lower resistance change rate after being stretched (compared to the resistance before being stretched). On the other hand, adding specific content of the one-dimensional metal material not only results in the conductivity of the conductive material, but also enhances the stretchability and the mechanical strength of the conductive material.

According to embodiments of the disclosure, the conductive material composition includes 40 to 80 parts by weight (e.g. 40 parts by weight, 45 parts by weight, 50 parts by weight, 55 parts by weight, 60 parts by weight, 65 parts by weight, 65 parts by weight, 70 parts by weight, 75 parts by weight, or 80 parts by weight) of disulfide resin having at least one terminal reactive functional group, and 20 to 60 parts by weight (e.g. 20 parts by weight, 25 parts by weight, 30 parts by weight, 35 parts by weight, 40 parts by weight, 45 parts by weight, 50 parts by weight, 55 parts by weight, or 60 parts by weight) of metal material. The disulfide resin having at least one terminal reactive functional group can be disulfide resin having one terminal reactive functional group, or disulfide resin having two terminal reactive functional groups. The terminal reactive functional group is independently acrylate group, methacrylate group, glycidyl group, oxiranyl group, oxetanyl group, or 3,4-epoxycyclohexyl group. The metal material includes a one-dimensional metal material. According to embodiments of the disclosure, the conductive material composition is composed of 40 to 80 parts by weight of the disulfide resin having at least one terminal reactive functional group and 20 to 60 parts by weight of the metal material. According to embodiments, the total weight of the disulfide resin having at least one terminal reactive functional group and the metal material is 100 parts by weight. According to embodiments of the disclosure, the disulfide resin having at least one terminal reactive functional group may have a molecular weight (e.g. number average molecular weight) of about 100 to 50,000, such as about 200 to 45,000, 200 to 40,000, 300 to 40,000, 400 to 40,000, or 500 to 50,000. As the molecular weight of the disulfide resin having at least one terminal reactive functional group is increased, the stretchability of the curing product of the conductive material composition is enhanced.

According to embodiments of the disclosure, the conductive material composition may further include a third compound. The third compound is a monomer having at least one reactive functional group, epoxy resin having at least one reactive functional group, oxetanyl resin having at least one reactive functional group, acrylate resin having at least one reactive functional group, methacrylate resin having at least one reactive functional group, or a combination thereof, wherein the reactive functional group is acrylate group, methacrylate group, glycidyl group, oxiranyl group, oxetanyl group, or 3,4-epoxycyclohexyl group. According to embodiments of the disclosure, the purpose of adding the third compound is adjusting the resin structure after polymerization, and modifying the stretchable property of the conductive material composition. According to embodiments, the third compound and the disulfide resin having at least one terminal reactive functional group have a weight ratio of 1:99 to 1:1, such as 1:50, 1:9, 1:8, 1:7, 1:6, 1:5, 1:4, 1:3, 1:2, or 1:1. According to embodiments of the disclosure, the epoxy resin can be bisphenol A epoxy resin, bisphenol F epoxy resin, bisphenol S epoxy resin, novolac epoxy resin, biphenyl epoxy resin, or cyclopentadiene epoxy resin.

According to embodiments of the disclosure, the disulfide resin having at least one terminal reactive functional group may have a chemical formula of

wherein n is an integer of 1 to 200, each of $R^1$ and $R^2$ is independently of hydrogen or methyl group, and A is $C_{3-20}$ group having at least one reactive functional group. In $C_{3-20}$ group, any —$CH_2$— can be replaced with —O—, —CO—, or —COO—. B is $C_{1-18}$ alkyl group, $C_{1-18}$ alkoxy group, or $C_{3-20}$ group having at least one reactive functional group. In $C_{3-20}$ group, any —$CH_2$— can be replaced with —O—, —CO—, or —COO—. The reactive functional group can be acrylate group, methacrylate group, glycidyl group, oxiranyl group, oxetanyl group, or 3,4-epoxycyclohexyl group. $C_{1-18}$ alkyl group can be linear or branched alkyl group. For example, $C_{1-18}$ alkyl group can be methyl, ethyl, propyl, butyl, pentyl, hexyl, heptyl, octyl, or an isomer thereof. According to embodiments of the disclosure, $C_{1-18}$ alkoxy group can be linear or branched alkoxy group. For example, $C_{1-18}$ alkoxy group can be methoxy, ethoxy, propoxy, butoxy, pentyloxy, hexyloxy, heptyloxy, octyloxy, or an isomer thereof.

According to embodiments of the disclosure, the disulfide resin having at least one terminal reactive functional group may have a chemical formula of

wherein n is an integer of 1 to 200, and each of $R^1$ and $R^2$ is independently of hydrogen or methyl group. Each of $R^3$ and $R^4$ is independently of acrylate group, methacrylate group, glycidyl group, oxiranyl group, oxetanyl group, or 3,4-epoxycyclohexyl group. Each of $R^5$ and $R^6$ is independently of single bonding or $C_{1-17}$ alkylene group, In $C_{1-17}$ alkylene group, any —$CH_2$— can be replaced with —O—, —CO—, or —COO—. The $C_{1-17}$ alkylene group can be linear or branched alkyleen group. For example, $C_{1-17}$ alkylene group can be methylene group, ethylene group, propylene group, butylene group, pentylene group, hexylene group, heptylene group, octylene group, or an isomer thereof. According to embodiments of the disclosure, each of $R^3$ and $R^4$ can be independently of acrylate group, methacrylate group, or 3,4-epoxycyclohexyl group to efficiently control the reactivity of the conductive material composition (e.g. prevent the undesired reaction).

According to embodiments of the disclosure, the disulfide resin having at least one terminal reactive functional group may have a chemical formula of

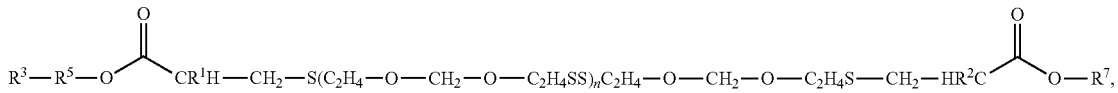

wherein n is an integer of 1 to 200. Each of $R^1$ and $R^2$ is independently of hydrogen or methyl group. $R^3$ is acrylate group, methacrylate group, glycidyl group, oxiranyl group, oxetanyl group, or 3,4-epoxycyclohexyl group. $R^5$ is single bond or $C_{1-17}$ alkylene group. In $C_{1-17}$ alkylene group, any —$CH_2$— can be replaced with —O—, —CO—, or —COO—. $R^7$ is $C_{1-18}$ alkyl group or $C_{1-18}$ alkoxy group.

According to embodiments, the disulfide resin having at least one terminal reactive functional group is a product of reacting disulfide mercaptan and acrylate compound, wherein the acrylate compound includes a first compound having two reactive functional groups, one reactive functional group of the first compound is acrylate group or methacrylate group, and the other reactive functional group of the first group is acrylate group, methacrylate group, glycidyl group, oxiranyl group, oxetanyl group, or 3,4-epoxycyclohexyl group.

According to embodiments of the disclosure, the disulfide mercaptan has a chemical formula of Formula (I).

$$HS(C_2H_4—O—CH_2—O—C_2H_4SS)_nC_2H_4—O—CH_2—O—C_2H_4SH \qquad \text{Formula (I)}$$

n is an integer of 1 to 200 (e.g. 1, 10, 20, 30, 40, 50, 60, 70, 80, 90, 100, 110, 120, 130, 140, 150, 160, 170, 180, 190, or 200).

According to embodiments of the disclosure, the first compound can be (3-ethyl-3-oxetanyl)methyl methacrylate, 3,4-epoxycyclohexylmethyl acrylate, 1,6-hexanediol diacrylate (HDDA), glycidyl methacrylate (GMA), glycidyl acrylate, dipropylene glycol diacrylate (DPGDA), ethoxylated bisphenol-A dimethacrylate, ethoxylated bisphenol-A diacrylate, polyethylene glycol dimethacrylate, polypropylene glycol dimethacrylate, polyethylene glycol diacrylate, polypropylene glycol diacrylate, tricyclodecane dimethanol diacrylate, propoxylated neopentyl glycol diacrylate, tripropylene glycol diacrylate, or a combination thereof. According to embodiments of the disclosure, the first compound can be aliphatic urethane acrylate, aromatic urethane acrylate, aliphatic urethane methacrylate, or aromatic urethane methacrylate. According to embodiments of the disclosure, the first compound can be SR-601NS (Sartomer), SR348 L NS (Sartomer), SR349 NS (Sartomer), SR601 NS (Sartomer), SR480 NS (Sartomer), SR602 NS (Sartomer), SR603 OP (Sartomer), SR610 NS (Sartomer), SR644 (Sartomer), SR833S (Sartomer), SR9003S (Sartomer), SR306 TFN (Sartomer), CN9007 (Sartomer), CN8881 NS (Sartomer), CN9014 NS (Sartomer), CN964 (Sartomer), CN9178 NS (Sartomer), CN965NS (Sartomer), CN969 NS (Sartomer), CN980 NS (Sartomer), CN981 NS (Sartomer), CN983 NS (Sartomer), CN9893 NS (Sartomer), CN991 NS (Sartomer), CN996 NS (Sartomer), CN9167 (Sartomer), CN978 NS (Sartomer), CN2203 NS (Sartomer), CN2254 NS (Sartomer), CN2283 NS (Sartomer), CN7001 NS (Sartomer), CN8010 NS (Sartomer), CN104 NS (Sartomer), CN110 NS (Sartomer), CN117 (Sartomer), CN120 NS (Sartomer), CN159 NS (Sartomer), CN2003 NS (Sartomer), CN307 (Sartomer), PEG(200)DA (DBC), 127-100 (DBC), 129 (DBC), 1700 (DBC), 1701 (DBC), 1710 (DBC), 1720 (DBC), or 541 (DBC).

According to embodiments of the disclosure, the acrylate compound further includes a second compound. The second compound is monoacrylate compound or monomethacrylate compound, and the second compound is free of glycidyl group, oxiranyl group, oxetanyl group, or 3,4-epoxycyclohexyl group.

According to embodiments of the disclosure, the second compound is methoxy polyethylene glycol monoacrylate, methoxy polyethylene glycol monomethacrylate, alkoxylated lauryl acrylate, tetrahydrofurfuryl acrylate, tetrahydrofurfuryl methacrylate, lauryl methacrylate, lauryl acrylate, 2-(2-ethoxyethoxy) ethyl acrylate, stearyl methacrylate, stearyl acrylate, isodecyl acrylate, isodecyl acrylate, 2-phenoxyethyl acrylate, 2-phenoxyethyl methacrylate, trimethylcyclohexyl methacrylate, trimethylcyclohexyl acrylate, isobornyl methacrylate, isobornyl acrylate, tridecyl acrylate, tridecyl methacrylate, ethoxylated nonyl phenol acrylate, octyldecyl acrylate, octyldecyl acrylate, cyclic trimethylolpropane formal acrylate, 2-hydroxyethyl acrylate, 2-hydroxyethyl methacrylate, ethylhexyl acrylate, ethylhexyl acrylate, or a combination thereof. According to embodiments of the disclosure, the second compound can be CD553 (Sartomer), CD552 (Sartomer), CD9075 (Sartomer), SR203 (Sartomer), SR256 (Sartomer), SR313A (Sartomer), SR324 (Sartomer), SR335 (Sartomer), SR395NS (Sartomer), SR339 NS (Sartomer), SR340 (Sartomer), SR420 (Sartomer), SR423 NS (Sartomer), SR489D (Sartomer), SR504 NS (Sartomer), SR506NS (Sartomer), SR484 (Sartomer), SR506 NS (Sartomer), SR531 (Sartomer), SR550 (Sartomer), SR551 (Sartomer), or SR614 NS (Sartomer).

All of the three dimensions (length, width, and height) of the metal material in the disclosure can be less than or equal to 300 μm (e.g. 100 nm to 300 μm). According to embodiments, the metal material includes a one-dimensional metal material. In addition, the metal material further includes a two-dimensional metal material, a three-dimensional metal material, or a combination thereof according to embodiments of the disclosure. Here, the one-dimensional material and the metal material have a weight ratio of 1:99 to 99:1. Next, the metal material of the disclosure can be the one-dimensional metal material, the two-dimensional metal material, three-dimensional metal material, or a combination thereof according to embodiments of the disclosure. The "one-dimensional metal material" of the disclosure means that the metal material has a length to width ratio of 5:1 to 5000:1, a length to height ratio of 5:1 to 5000:1, and a width to height ratio of 4.99:1 to 1:4.99. The "two-dimensional metal material" of the disclosure means that the metal material has a length to width ratio of 5:1 to 1:5, a length to height ratio of 5:1 to 5000:1, and a width to height ratio of 5:1 to 5000:1. The "three-dimensional metal material" of the disclosure means that the metal material has a length to width ratio of 4.99:1 to 1:4.99, a length to height ratio of 4.99:1 to 1:4.99, and a width to height ratio of 4.99:1 to 1:4.99.

According to embodiments, the one-dimensional metal material can be metal rod, metal wire, metal ribbon, metal tube, metal tip, metal pillar, metal fiber, or a combination thereof. According to embodiments, the one-dimensional metal material is metal wire having a diameter of 20 nm to 200 nm and a length of 5 μm to 300 μm.

According to embodiments of the disclosure, the two-dimensional metal material is metal flake, metal plate, metal disk, or a combination thereof.

According to embodiments of the disclosure, the three-dimensional metal material is metal powder, metal ball, or a combination thereof.

According to embodiments of the disclosure, the metal material includes titanium, iron, cobalt, nickel, platinum, copper, silver, gold, zinc, aluminum, indium, tin, an alloy thereof, or a composite thereof. According to embodiments of the disclosure, the metal material can be alloy, wherein the metal included in the alloy includes titanium, iron, cobalt, nickel, platinum, copper, silver, gold, zinc, aluminum, indium, or tin. According to embodiments of the disclosure, the metal can be a composite metal material, wherein the composite metal material includes at least two metal, and the metal is titanium, iron, cobalt, nickel, platinum, copper, silver, gold, zinc, aluminum, indium, or tin.

According to embodiments of the disclosure, the conductive material composition further includes an additive. For example, the additive may include (but is not limited thereto) initiator, hardener, leveling agent, filler, colorant, defoamer, stabilizer, flame retardant, or a combination thereof. The additive can be used alone or in combination. The additive amount can be adjusted by one skilled in the art viewing the disclosure as needed based on skill in the art without particular limitation. For example, the additional amount of additive is 0.1 wt % to 10 wt % on the basis of the total weight of the disulfide resin having at least one terminal reactive functional group and the metal material.

According to embodiments of the disclosure, the initiator can be peroxide initiator, azo compound initiator, or persulfate initiator. According to embodiments of the disclosure, the peroxide initiator can be benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylpeorxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or a combination thereof. According to embodiments of the disclosure, the azo compound initiator can be N,N'-azobisisobutyronitrile (AIBN), 2,2'-azobisisoheptonitrile (ABVN), 2,2'-azo bis-(2-methylbutyronitrile (AMBN), 1,1'-Azobis(cyclohexane-1-carbonitrile (ACCN), 1-((cyano-1-methylethyl)azo) formamide (CABN), 2,2'-azobis(2-methylpropionamide) dihydrochloride (AIBA), dimethyl 2,2'-azobis(2-methylpropionate (AIBME), 2,2'-azobis[2-(2-imidazolin-2-yl)propane]dihydrochloride (AIBI), or a combination thereof. According to embodiments of the disclosure, the persulfate initiator can be sodium persulfate, potassium persulfate, ammonium persulfate, or a combination thereof.

According to embodiments of the disclosure, the disclosure also provides a conductive material being a curing product obtained by curing the conductive material composition of the disclosure. The curing process can be performed at a temperature of 80° C. to 200° C. for a period of 10 minutes to 120 minutes.

Below, exemplary embodiments will be described in detail with reference to the accompanying drawings so as to be easily realized by a person having ordinary knowledge in the art. The inventive concept may be embodied in various

EXAMPLES

Preparation of Disulfide Resin Having at Least One Terminal Reactive Functional Group

Preparation Example 1

15 g of polysulfide (Thiokol LP-3, commercially available from Toray Fine Chemicals Co., Ltd.), 5.3835 g of 3,4-epoxycyclohexylmethyl acrylate, 0.6115 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (1).

Preparation Example 2

15 g of polysulfide (Thiokol LP-23, commercially available from Toray Fine Chemicals Co., Ltd.), 2.319 g of 3,4-epoxycyclohexylmethyl acrylate, 0.5196 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (2).

Preparation Example 3

15 g of polysulfide (Thiokol LP-23, commercially available from Toray Fine Chemicals Co., Ltd.), 1.491 g of 3,4-epoxycyclohexylmethyl acrylate, 0.4947 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (3).

Preparation Example 4

15 g of polysulfide (Thiokol LP-31, commercially available from Toray Fine Chemicals Co., Ltd.), 1.1595 g of 3,4-epoxycyclohexylmethyl acrylate, 0.4848 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (4).

Preparation Example 5

15 g of polysulfide (Thiokol LP-55, commercially available from Toray Fine Chemicals Co., Ltd.), 2.3265 g of glycidyl methacrylate (GMA), 0.5198 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (5).

Preparation Example 6

15 g of polysulfide (Thiokol LP-56, commercially available from Toray Fine Chemicals Co., Ltd.), 5.5845 g of ethoxylated bisphenol-A dimethacrylate (SR-601NS, commercially available from Sartomer), 0.6175 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (6).

Preparation Example 7

15 g of polysulfide (Thiokol LP-56, commercially available from Toray Fine Chemicals Co., Ltd.), 2.4655 g of 1,6-hexanediol diacrylate (HDDA), 0.524 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (7).

Preparation Example 8

15 g of polysulfide (Thiokol LP-56, commercially available from Toray Fine Chemicals Co., Ltd.), 0.6327 g of 2-hydroxyethyl acrylate (2-HEA), 1.32 g of dipropylene glycol diacrylate (DPGDA), 0.5086 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (8).

Preparation Example 9

15 g of polysulfide (Thiokol LP-56, commercially available from Toray Fine Chemicals Co., Ltd.), 0.8509 g of Tetrahydrofurfuryl acrylate (THFA), 1.0036 g of (3-ethyl-3-oxetanyl)methyl methacrylate, 0.5056 g of 2,2-azobisisobutyronitrile (AIBN), and 10 g of dimethylacetamide (DMAc) were sequentially added into a reaction bottle, stirred and heated to 60° C., and reacted at 60° C. for 24 hours. The product was concentrated by rotary pump to obtain a disulfide resin having at least one terminal reactive functional group (9).

Preparation of Conductive Material Composition

Example 1

60 parts by weight of the disulfide resin having at least one terminal reactive functional group (1), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc)

were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a conductive material composition (1). Subsequently, the dispersibility of the conductive material composition (1) was tested, and the test results are shown in Table 1. The dispersibility test was performed by following steps: the conductive material composition was printed by stencil printing (thickness=40 μm) to form a wet film with a size of 5 cm×1 cm on a glass substrate, and checked by human eye. If no aggregated particles were observed, the dispersibility test would be passed.

Subsequently, the conductive material composition (1) was printed by screen printing to form a wet film with a size of 1 cm×1 cm on a glass substrate, and baked at 140° C. for 30 minutes to obtain a conductive film (1). The resistivity of the conductive film (1) was measured by a four-point probe resistance meter (LORESTA-AX, commercially available from Mitsubishi Chemical Co.), and the measurement results are shown in Table 1.

Example 2

Example 2 was similar to Example 1, and the difference in Example 2 was the disulfide resin having at least one terminal reactive functional group (1) being replaced with disulfide resin having at least one terminal reactive functional group (2) to obtain the conductive material composition (2). Subsequently, the dispersibility of the conductive material composition (2) was tested, and the test results are shown in Table 1. Subsequently, the conductive material composition (2) was printed by screen printing to form a wet film with a size of 1 cm×1 cm on a glass substrate, and baked at 140° C. for 30 minutes to obtain a conductive film (2). The resistivity of the conductive film (2) was measured by a four-point probe resistance meter (LORESTA-AX, commercially available from Mitsubishi Chemical Co.), and the measurement results are shown in Table 1.

Example 3

Example 3 was similar to Example 1, and the difference in Example 3 was the disulfide resin having at least one terminal reactive functional group (1) being replaced with disulfide resin having at least one terminal reactive functional group (3) to obtain the conductive material composition (3). Subsequently, the dispersibility of the conductive material composition (3) was tested, and the test results are shown in Table 1. Subsequently, the conductive material composition (3) was printed by screen printing to form a wet film with a size of 1 cm×1 cm on a glass substrate, and baked at 140° C. for 30 minutes to obtain a conductive film (3). The resistivity of the conductive film (3) was measured by a four-point probe resistance meter (LORESTA-AX, commercially available from Mitsubishi Chemical Co.), and the measurement results are shown in Table 1.

Example 4

Example 4 was similar to Example 1, and the difference in Example 4 was the disulfide resin having at least one terminal reactive functional group (1) being replaced with disulfide resin having at least one terminal reactive functional group (4) to obtain the conductive material composition (4). Subsequently, the dispersibility of the conductive material composition (4) was tested, and the test results are shown in Table 1. Subsequently, the conductive material composition (4) was printed by screen printing to form a wet film with a size of 1 cm×1 cm on a glass substrate, and baked at 140° C. for 30 minutes to obtain a conductive film (4). The resistivity of the conductive film (4) was measured by a four-point probe resistance meter (LORESTA-AX, commercially available from Mitsubishi Chemical Co.), and the measurement results are shown in Table 1.

Example 5

Example 5 was similar to Example 1, and the difference in Example 5 was the disulfide resin having at least one terminal reactive functional group (1) being replaced with disulfide resin having at least one terminal reactive functional group (5) to obtain the conductive material composition (5). Subsequently, the dispersibility of the conductive material composition (5) was tested, and the test results are shown in Table 1. Subsequently, the conductive material composition (5) was printed by screen printing to form a wet film with a size of 1 cm×1 cm on a glass substrate, and baked at 140° C. for 30 minutes to obtain a conductive film (5). The resistivity of the conductive film (5) was measured by a four-point probe resistance meter (LORESTA-AX, commercially available from Mitsubishi Chemical Co.), and the measurement results are shown in Table 1.

Example 6

Example 6 was similar to Example 1, and the difference in Example 6 was the disulfide resin having at least one terminal reactive functional group (1) being replaced with disulfide resin having at least one terminal reactive functional group (6) to obtain the conductive material composition (6). Subsequently, the dispersibility of the conductive material composition (6) was tested, and the test results are shown in Table 1. Subsequently, the conductive material composition (6) was printed by screen printing to form a wet film with a size of 1 cm×1 cm on a glass substrate, and baked at 140° C. for 30 minutes to obtain a conductive film (6). The resistivity of the conductive film (6) was measured by a four-point probe resistance meter (LORESTA-AX, commercially available from Mitsubishi Chemical Co.), and the measurement results are shown in Table 1.

Example 7

Example 7 was similar to Example 1, and the difference in Example 7 was the disulfide resin having at least one terminal reactive functional group (1) being replaced with disulfide resin having at least one terminal reactive functional group (7) to obtain the conductive material composition (7). Subsequently, the dispersibility of the conductive material composition (7) was tested, and the test results are shown in Table 1. Subsequently, the conductive material composition (7) was printed by screen printing to form a wet film with a size of 1 cm×1 cm on a glass substrate, and baked at 140° C. for 30 minutes to obtain a conductive film (7). The resistivity of the conductive film (7) was measured by a four-point probe resistance meter (LORESTA-AX, commercially available from Mitsubishi Chemical Co.), and the measurement results are shown in Table 1.

Example 8

Example 8 was similar to Example 1, and the difference in Example 8 was the disulfide resin having at least one terminal reactive functional group (1) being replaced with disulfide resin having at least one terminal reactive functional group (8) to obtain the conductive material composition (8). Subsequently, the dispersibility of the conductive material composition (8) was tested, and the test results are shown in Table 1. Subsequently, the conductive material composition (8) was printed by screen printing to form a wet film with a size of 1 cm×1 cm on a glass substrate, and baked at 140° C. for 30 minutes to obtain a conductive film (8). The resistivity of the conductive film (8) was measured by a four-point probe resistance meter (LORESTA-AX, commercially available from Mitsubishi Chemical Co.), and the measurement results are shown in Table 1.

Example 9

Example 9 was similar to Example 1, and the difference in Example 9 was the disulfide resin having at least one terminal reactive functional group (1) being replaced with disulfide resin having at least one terminal reactive functional group (9) to obtain the conductive material composition (9). Subsequently, the dispersibility of the conductive material composition (9) was tested, and the test results are shown in Table 1. Subsequently, the conductive material composition (9) was printed by screen printing to form a wet film with a size of 1 cm×1 cm on a glass substrate, and baked at 140° C. for 30 minutes to obtain a conductive film (9). The resistivity of the conductive film (9) was measured by a four-point probe resistance meter (LORESTA-AX, commercially available from Mitsubishi Chemical Co.), and the measurement results are shown in Table 1.

TABLE 1

| | Disulfide resin | Dispersibility test | Resistivity ($\Omega \cdot$ cm) |
|---|---|---|---|
| Example 1 | Disulfide resin having at least one terminal reactive functional group (1) | Pass | $1.42 \times 10^{-4}$ |
| Example 2 | Disulfide resin having at least one terminal reactive functional group (2) | Pass | $1.15 \times 10^{-4}$ |
| Example 3 | Disulfide resin having at least one terminal reactive functional group (3) | Pass | $1.88 \times 10^{-4}$ |
| Example 4 | Disulfide resin having at least one at least one terminal reactive functional group (4) | Pass | $1.57 \times 10^{-4}$ |
| Example 5 | Disulfide resin having at least one terminal reactive functional group (5) | Pass | $1.74 \times 10^{-4}$ |
| Example 6 | Disulfide resin having at least one terminal reactive functional group (6) | Pass | $1.78 \times 10^{-4}$ |
| Example 7 | Disulfide resin having at least one terminal reactive functional group (7) | Pass | $1.46 \times 10^{-4}$ |
| Example 8 | Disulfide resin having at least one terminal reactive functional group (8) | Pass | $3.83 \times 10^{-4}$ |
| Example 9 | Disulfide resin having at least one terminal reactive functional group (9) | Pass | $2.65 \times 10^{-4}$ |

In the conductive material compositions of Examples 1 to 9, the silver of particle shaped, flake shaped, and wire shaped (e.g. silver powder, silver flake, and silver wire) could be simultaneously dispersed in the disulfide resin having at least one terminal epoxy functional group or terminal acrylate functional group by adding the disulfide resin having at least one terminal epoxy functional group or terminal acrylate functional group (e.g. modified polysulfide), such that the conductive material composition was evenly mixed and flowable. In addition, the disulfide resin itself had epoxy functional group or acrylate functional group, the conductive material composition (optionally including initiator or hardener) could be cured by heating. As shown in Table 1, the conductive films in Examples 1 to 7 (the curing product of the conductive material composition) had conductivity (and resistivity of about $1 \times 10^{-4}$ $\Omega \cdot$cm to $2 \times 10^{-4}$ $\Omega \cdot$cm). In addition, the disulfide resins used in Examples 8 and 9 only had one terminal epoxy functional group or one terminal acrylate functional group, and the conductive films (curing conductive material compositions) had resistivity of about $2 \times 10^{-4}$ $\Omega \cdot$cm to $4 \times 10^{-4}$ $\Omega \cdot$cm. In general, the silver nonowire was mainly synthesized in aqueous system and therefore not easily dispersed into organic phase. In the conductive material composition of the disclosure, the disulfide bondings in the disulfide resin could bond to silver and wrap silver, such that the hydrophilic linear silver nanopowder could be phase conversed and dispersed into the resin of organic phase.

With Epoxy Functional Group or Acrylate Functional Group

Example 10

12 parts by weight of cycloaliphatic epoxy resin monomer (YX8000, commercially available from Mitsubishi Chemical Corporation), 48 parts by weight of the disulfide resin having at least one terminal reactive functional group (1), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a conductive material composition (10). Subsequently, the dispersibility of the conductive material composition (10) was tested, and the test results are shown in Table 2.

Subsequently, the conductive material composition (10) was printed by screen printing to form a wet film with a size of 1 cm×1 cm on a glass substrate, and baked at 140° C. for 30 minutes to obtain a conductive film (10). The resistivity of the conductive film (10) was measured by a four-point probe resistance meter (LORESTA-AX, commercially available from Mitsubishi Chemical Co.), and the measurement results are shown in Table 2.

Example 11

Example 11 was similar to Example 10, and the difference in Example 11 was the disulfide resin having at least one terminal reactive functional group (1) being replaced with disulfide resin having at least one terminal reactive functional group (2) to obtain the conductive material composition (11). Subsequently, the dispersibility of the conductive material composition (11) was tested, and the test results are shown in Table 2. Subsequently, the conductive material composition (11) was printed by screen printing to form a wet film with a size of 1 cm×1 cm on a glass substrate, and baked at 140° C. for 30 minutes to obtain a conductive film (11). The resistivity of the conductive film (11) was measured by a four-point probe resistance meter (LORESTA-AX, commercially available from Mitsubishi Chemical Co.), and the measurement results are shown in Table 2.

Example 12

Example 12 was similar to Example 10, and the difference in Example 12 was the disulfide resin having at least one terminal reactive functional group (1) being replaced with disulfide resin having at least one terminal reactive functional group (3) to obtain the conductive material composition (12). Subsequently, the dispersibility of the conductive material composition (12) was tested, and the test results are shown in Table 2. Subsequently, the conductive material composition (12) was printed by screen printing to form a wet film with a size of 1 cm×1 cm on a glass substrate, and baked at 140° C. for 30 minutes to obtain a conductive film (12). The resistivity of the conductive film (12) was measured by a four-point probe resistance meter (LORESTA-AX, commercially available from Mitsubishi Chemical Co.), and the measurement results are shown in Table 2.

Example 13

Example 13 was similar to Example 10, and the difference in Example 13 was the disulfide resin having at least one terminal reactive functional group (1) being replaced with disulfide resin having at least one terminal reactive functional group (4) to obtain the conductive material composition (13). Subsequently, the dispersibility of the conductive material composition (13) was tested, and the test results are shown in Table 2. Subsequently, the conductive material composition (13) was printed by screen printing to form a wet film with a size of 1 cm×1 cm on a glass substrate, and baked at 140° C. for 30 minutes to obtain a conductive film (13). The resistivity of the conductive film (13) was measured by a four-point probe resistance meter (LORESTA-AX, commercially available from Mitsubishi Chemical Co.), and the measurement results are shown in Table 2.

Example 14

Example 14 was similar to Example 10, and the difference in Example 14 was the disulfide resin having at least one terminal reactive functional group (1) being replaced with disulfide resin having at least one terminal reactive functional group (5) to obtain the conductive material composition (14). Subsequently, the dispersibility of the conductive material composition (14) was tested, and the test results are shown in Table 2. Subsequently, the conductive material composition (14) was printed by screen printing to form a wet film with a size of 1 cm×1 cm on a glass substrate, and baked at 140° C. for 30 minutes to obtain a conductive film (14). The resistivity of the conductive film (14) was measured by a four-point probe resistance meter (LORESTA-AX, commercially available from Mitsubishi Chemical Co.), and the measurement results are shown in Table 2.

Example 15

Example 15 was similar to Example 10, and the difference in Example 15 was the disulfide resin having at least one terminal reactive functional group (1) being replaced with disulfide resin having at least one terminal reactive functional group (6) to obtain the conductive material composition (15). Subsequently, the dispersibility of the conductive material composition (15) was tested, and the test results are shown in Table 2. Subsequently, the conductive material composition (15) was printed by screen printing to form a wet film with a size of 1 cm×1 cm on a glass substrate, and baked at 140° C. for 30 minutes to obtain a conductive film (15). The resistivity of the conductive film (15) was measured by a four-point probe resistance meter (LORESTA-AX, commercially available from Mitsubishi Chemical Co.), and the measurement results are shown in Table 2.

Example 16

Example 16 was similar to Example 10, and the difference in Example 16 was the disulfide resin having at least one terminal reactive functional group (1) being replaced with disulfide resin having at least one terminal reactive functional group (7) to obtain the conductive material composition (16). Subsequently, the dispersibility of the conductive material composition (16) was tested, and the test results are shown in Table 2. Subsequently, the conductive material composition (16) was printed by screen printing to form a wet film with a size of 1 cm×1 cm on a glass substrate, and baked at 140° C. for 30 minutes to obtain a conductive film (16). The resistivity of the conductive film (16) was measured by a four-point probe resistance meter (LORESTA-AX, commercially available from Mitsubishi Chemical Co.), and the measurement results are shown in Table 2.

Example 17

Example 17 was similar to Example 10, and the difference in Example 17 was the disulfide resin having at least one terminal reactive functional group (1) being replaced with disulfide resin having at least one terminal reactive functional group (8) to obtain the conductive material composition (17). Subsequently, the dispersibility of the conductive material composition (17) was tested, and the test results are shown in Table 2. Subsequently, the conductive material composition (17) was printed by screen printing to form a wet film with a size of 1 cm×1 cm on a glass substrate, and baked at 140° C. for 30 minutes to obtain a conductive film (17). The resistivity of the conductive film (17) was measured by a four-point probe resistance meter (LORESTA-AX, commercially available from Mitsubishi Chemical Co.), and the measurement results are shown in Table 2.

Example 18

Example 18 was similar to Example 10, and the difference in Example 18 was the disulfide resin having at least one terminal reactive functional group (1) being replaced with disulfide resin having at least one terminal reactive functional group (9) to obtain the conductive material composition (18). Subsequently, the dispersibility of the conductive material composition (18) was tested, and the test results are shown in Table 2. Subsequently, the conductive material composition (18) was printed by screen printing to form a wet film with a size of 1 cm×1 cm on a glass substrate, and baked at 140° C. for 30 minutes to obtain a conductive film (18). The resistivity of the conductive film (18) was measured by a four-point probe resistance meter (LORESTA-AX, commercially available from Mitsubishi Chemical Co.), and the measurement results are shown in Table 2.

TABLE 2

| | Cycloaliphatic epoxy resin monomer (12 parts by weight) | Disulfide resin having at least one terminal reactive functional group (48 parts by weight) | Dispersibility test | Resistivity ($\Omega \cdot cm$) |
|---|---|---|---|---|
| Example 10 | YX8000 | Disulfide resin having at least one terminal reactive functional group (1) | Pass | $2.48 \times 10^{-4}$ |
| Example 11 | YX8000 | Disulfide resin having at least one terminal reactive functional group (2) | Pass | $1.38 \times 10^{-4}$ |
| Example 12 | YX8000 | Disulfide resin having at least one terminal reactive functional group (3) | Pass | $2.87 \times 10^{-4}$ |
| Example 13 | YX8000 | Disulfide resin having at least one terminal reactive functional group (4) | Pass | $1.61 \times 10^{-4}$ |
| Example 14 | YX8000 | Disulfide resin having at least one terminal reactive functional group (5) | Pass | $2.48 \times 10^{-4}$ |
| Example 15 | YX8000 | Disulfide resin having at least one terminal reactive functional group (6) | Pass | $1.77 \times 10^{-4}$ |
| Example 16 | YX8000 | Disulfide resin having at least one terminal reactive functional group (7) | Pass | $2.23 \times 10^{-4}$ |
| Example 17 | YX8000 | Disulfide resin having at least one terminal reactive functional group (8) | Pass | $4.74 \times 10^{-4}$ |
| Example 18 | YX8000 | Disulfide resin having at least one terminal reactive functional group (9) | Pass | $3.87 \times 10^{-4}$ |

Comparative Example 1

20.2 parts by weight of cycloaliphatic epoxy resin monomer (YX8000, commercially available from Mitsubishi Chemical Corporation), 50 parts by weight of the polysulfide (Thiokol LP-3, commercially available from Toray Fine Chemicals Co., Ltd.), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 3.006 parts by weight of initiator tetra-n-butylammonium fluoride (TBAF, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (1). Subsequently, the dispersibility of the composition (1) was tested, and the test results are shown in Table 3.

Subsequently, the composition (1) was printed by screen printing to form a wet film with a size of 1 cm×1 cm on a glass substrate, and baked at 140° C. for 30 minutes to obtain a film (1). The resistivity of the film (1) was measured by a four-point probe resistance meter (LORESTA-AX, commercially available from Mitsubishi Chemical Co.), and the measurement results are shown in Table 3.

Comparative Example 2

8.7 parts by weight of cycloaliphatic epoxy resin monomer (YX8000, commercially available from Mitsubishi Chemical Corporation), 50 parts by weight of the polysulfide (Thiokol LP-23, commercially available from Toray Fine Chemicals Co., Ltd.), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 2.661 parts by weight of initiator tetra-n-butylammonium fluoride (TBAF, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (2). Subsequently, the dispersibility of the composition (2) was tested, and the test results are shown in Table 3.

Subsequently, the composition (2) was printed by screen printing to form a wet film with a size of 1 cm×1 cm on a glass substrate, and baked at 140° C. for 30 minutes to obtain a film (2). The resistivity of the film (2) was measured by a four-point probe resistance meter (LORESTA-AX, commercially available from Mitsubishi Chemical Co.), and the measurement results are shown in Table 3.

Comparative Example 3

5.6 parts by weight of cycloaliphatic epoxy resin monomer (YX8000, commercially available from Mitsubishi Chemical Corporation), 50 parts by weight of the polysulfide (Thiokol LP-55, commercially available from Toray Fine Chemicals Co., Ltd.), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 2.568 parts by weight of initiator tetra-n-butylammonium fluoride (TBAF, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (3). Subsequently, the dispersibility of the composition (3) was tested, and the test results are shown in Table 3.

Subsequently, the composition (3) was printed by screen printing to form a wet film with a size of 1 cm×1 cm on a glass substrate, and baked at 140° C. for 30 minutes to obtain a film (3). The resistivity of the film (3) was measured by a four-point probe resistance meter (LORESTA-AX, commercially available from Mitsubishi Chemical Co.), and the measurement results are shown in Table 3.

Comparative Example 4

4.4 parts by weight of cycloaliphatic epoxy resin monomer (YX8000, commercially available from Mitsubishi Chemical Corporation), 50 parts by weight of the polysulfide (Thiokol P-31, commercially available from Toray Fine Chemicals Co., Ltd.), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 2.532 parts by weight of initiator tetra-n-butylammonium fluoride (TBAF, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (4). Subsequently, the dispersibility of the composition (4) was tested, and the test results are shown in Table 3.

Subsequently, the composition (4) was printed by screen printing to form a wet film with a size of 1 cm×1 cm on a glass substrate, and baked at 140° C. for 30 minutes to obtain a film (4). The resistivity of the film (4) was measured by a four-point probe resistance meter (LORESTA-AX, commercially available from Mitsubishi Chemical Co.), and the measurement results are shown in Table 3.

Comparative Example 5

60 parts by weight of cycloaliphatic epoxy resin monomer (YX8000, commercially available from Mitsubishi Chemical Corporation), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 1.8 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (5). Subsequently, the dispersibility of the composition (5) was tested, and the test results are shown in Table 3.

Subsequently, the composition (5) was printed by screen printing to form a wet film with a size of 1 cm×1 cm on a glass substrate, and baked at 140° C. for 30 minutes to obtain a film (5). The resistivity of the film (5) was measured by a four-point probe resistance meter (LORESTA-AX, commercially available from Mitsubishi Chemical Co.), and the measurement results are shown in Table 3.

Comparative Example 6

60 parts by weight of difunctional bisphenol A/epichlorohydrin epoxy resin (EPON® Resin 828, commercially available from Shell Chemical), 25 parts by weight of silver powder having an average diameter of about 1.0 μm (S11000-10, commercially available from Ferro Japan), 5 parts by weight of silver flake (FA-D-5, commercially available from DOWA Electronics Materials Co., Ltd.), 1.8 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 10 parts by weight of silver nanowire having an average of diameter of 30 nm and an average length of 20 μm was then added to the mixture and then continuously stirred. Finally, the mixture was concentrated by rotary pump to obtain a composition (6). Subsequently, the dispersibility of the composition (6) was tested, and the test results are shown in Table 3.

Subsequently, the composition (6) was printed by screen printing to form a wet film with a size of 1 cm×1 cm on a glass substrate, and baked at 140° C. for 30 minutes to obtain a film (6). The resistivity of the film (6) was measured by a four-point probe resistance meter (LORESTA-AX, commercially available from Mitsubishi Chemical Co.), and the measurement results are shown in Table 3.

TABLE 3

| | Monomer having reactive functional group/resin | Polysulfide | Dispersibility test | Resistivity (Ω · cm) |
|---|---|---|---|---|
| Comparative Example 1 | YX8000 (20.2 parts by weight) | LP3 (50 parts by weight) | Pass | Not conductive |
| Comparative Example 2 | YX8000 (8.7 parts by weight) | LP23 (50 parts by weight) | Pass | Not conductive |
| Comparative Example 3 | YX8000 (5.6 parts by weight) | LP55 (50 parts by weight) | Pass | Not conductive |
| Comparative Example 4 | YX8000 (4.4 parts by weight) | P31 (50 parts by weight) | Pass | Not conductive |
| Comparative Example 5 | YX8000 (60 parts by weight) | — | Not pass | Not conductive |
| Comparative Example 6 | EPON ® Resin 828 (60 parts by weight) | — | Not pass | Not conductive |

Although the cycloaliphatic epoxy resin monomer is further added to the conductive material compositions in Examples 10 to 18, the silver of particle shaped, flake shaped, and wire shaped (e.g. silver powder, silver flake, and silver wire) could be simultaneously dispersed in the conducive material compositions by adding the disulfide resin having at least one terminal epoxy functional group or terminal acrylate functional group (e.g. modified polysulfide). As such, the conductive material compositions were evenly mixed and flowable. As shown in Table 2, the conductive films (the curing products of the conductive material compositions) in Examples 10 to 16 had conductivity (and resistivity of $1\times10^{-4}$ Ω·cm to $3\times10^{-4}$ Ω·cm). In addition, the disulfide resin used in Examples 8 and 9 only had one terminal epoxy functional group or one terminal acrylate functional group, and the curing product had resistivity of $3\times10^{-4}$ Ω·cm to $5\times10^{-4}$ Ω·cm. The disulfide resin having at least one terminal epoxy functional group or terminal acrylate functional group (e.g. modified polysulfide) may help to efficiently disperse the metal material to other resin and be cured with the other resin together. As such, the conductive material compositions after being cured were still conductive. Comparative Examples 1 to 4 utilized the non-modified polysulfide and cycloaliphatic epoxy resin monomer to prepare the compositions. As shown in Table 3, although the silver of particle shaped, flake shaped, and wire shaped (e.g. silver powder, silver flake, and silver wire) could be simultaneously dispersed in the composition by non-modified polysulfide, the obtained compositions after being cured were not conductive. Comparative Examples 5 and 6 only utilized the epoxy resin to prepare the compositions (without the disulfide resin having at least one terminal epoxy functional group or terminal acrylate functional group of the disclosure). As shown in Table 3, the silver of particle shaped, flake shaped, and wire shaped (e.g. silver powder, silver flake, and silver wire) could not be dispersed in the epoxy resins, and the compositions after being cure were not conductive.

Example 19

40 parts by weight of the disulfide resin having at least one terminal reactive functional group (4), 11.4 parts by weight of silver powder having an average diameter of about 1.0 μm (S11000-10, commercially available from Ferro Japan), 45.6 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 3 parts by weight of silver nanowire having an average of diameter of 30 nm and an average length of 20 μm was then added to the mixture and then continuously stirred. Finally, the mixture was concentrated by rotary pump to obtain a conductive material composition (19). Subsequently, the dispersibility of the conductive material composition (19) was tested, and the test results are shown in Table 4.

Subsequently, the conductive material composition (19) was printed by screen printing to form a wet film with a size of 1 cm×1 cm on a glass substrate, and baked at 140° C. for 30 minutes to obtain a conductive film (19). The resistivity of the conductive film (19) was measured by a four-point probe resistance meter (LORESTA-AX, commercially available from Mitsubishi Chemical Co.), and the measurement results are shown in Table 4.

Example 20

Example 20 was similar to Example 19, and the difference in Example 20 was the disulfide resin having at least one terminal reactive functional group (4) being replaced with disulfide resin having at least one terminal reactive functional group (5) to obtain the conductive material composition (20). Subsequently, the dispersibility of the conductive material composition (20) was tested, and the test results are shown in Table 4. Subsequently, the conductive material composition (20) was printed by screen printing to form a wet film with a size of 1 cm×1 cm on a glass substrate, and baked at 140° C. for 30 minutes to obtain a conductive film (20). The resistivity of the conductive film (20) was measured by a four-point probe resistance meter (LORESTA-AX, commercially available from Mitsubishi Chemical Co.), and the measurement results are shown in Table 4.

Example 21

Example 21 was similar to Example 19, and the difference in Example 20 was the disulfide resin having at least one terminal reactive functional group (4) being replaced with disulfide resin having at least one terminal reactive functional group (7) to obtain the conductive material composition (21). Subsequently, the dispersibility of the conductive material composition (21) was tested, and the test results are shown in Table 4. Subsequently, the conductive material composition (21) was printed by screen printing to form a wet film with a size of 1 cm×1 cm on a glass substrate, and baked at 140° C. for 30 minutes to obtain a conductive film (21). The resistivity of the conductive film (21) was measured by a four-point probe resistance meter (LORESTA-AX, commercially available from Mitsubishi Chemical Co.), and the measurement results are shown in Table 4.

Example 22

Example 22 was similar to Example 19, and the difference in Example 20 was the disulfide resin having at least one terminal reactive functional group (4) being replaced with disulfide resin having at least one terminal reactive functional group (9) to obtain the conductive material composition (22). Subsequently, the dispersibility of the conductive material composition (22) was tested, and the test results are shown in Table 4. Subsequently, the conductive material composition (22) was printed by screen printing to form a wet film with a size of 1 cm×1 cm on a glass substrate, and baked at 140° C. for 30 minutes to obtain a conductive film (22). The resistivity of the conductive film (22) was measured by a four-point probe resistance meter (LORESTA-AX, commercially available from Mitsubishi Chemical Co.), and the measurement results are shown in Table 4.

Example 23

80 parts by weight of the disulfide resin having at least one terminal reactive functional group (4), 1 part by weight of silver powder having an average diameter of about 1.0 μm (S11000-10, commercially available from Ferro Japan), 4 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 15 parts by weight of silver nanowire having an average of diameter of 30 nm and an average length of 20 μm was then added to the mixture and then continuously stirred. Finally, the mixture was concentrated by rotary pump to obtain a conductive material composition (23). Subsequently, the dispersibility of the conductive material composition (23) was tested, and the test results are shown in Table 4.

Subsequently, the conductive material composition (23) was printed by screen printing to form a wet film with a size of 1 cm×1 cm on a glass substrate, and baked at 140° C. for 30 minutes to obtain a conductive film (23). The resistivity of the conductive film (23) was measured by a four-point probe resistance meter (LORESTA-AX, commercially available from Mitsubishi Chemical Co.), and the measurement results are shown in Table 4.

Example 24

Example 24 was similar to Example 23, and the difference in Example 24 was the disulfide resin having at least one terminal reactive functional group (4) being replaced with disulfide resin having at least one terminal reactive functional group (5) to obtain the conductive material composition (24). Subsequently, the dispersibility of the conductive material composition (24) was tested, and the test results are shown in Table 4. Subsequently, the conductive material composition (24) was printed by screen printing to form a wet film with a size of 1 cm×1 cm on a glass substrate, and baked at 140° C. for 30 minutes to obtain a conductive film (24). The resistivity of the conductive film (24) was measured by a four-point probe resistance meter (LORESTA-AX, commercially available from Mitsubishi Chemical Co.), and the measurement results are shown in Table 4.

Example 25

Example 25 was similar to Example 23, and the difference in Example 25 was the disulfide resin having at least one terminal reactive functional group (4) being replaced with disulfide resin having at least one terminal reactive functional group (7) to obtain the conductive material composition (25). Subsequently, the dispersibility of the conductive material composition (25) was tested, and the test results are shown in Table 4. Subsequently, the conductive material composition (25) was printed by screen printing to form a wet film with a size of 1 cm×1 cm on a glass substrate, and baked at 140° C. for 30 minutes to obtain a conductive film (25). The resistivity of the conductive film (25) was measured by a four-point probe resistance meter (LORESTA-AX, commercially available from Mitsubishi Chemical Co.), and the measurement results are shown in Table 4.

Example 26

Example 26 was similar to Example 23, and the difference in Example 26 was the disulfide resin having at least one terminal reactive functional group (4) being replaced with disulfide resin having at least one terminal reactive functional group (9) to obtain the conductive material composition (26). Subsequently, the dispersibility of the conductive material composition (26) was tested, and the test results are shown in Table 4. Subsequently, the conductive material composition (26) was printed by screen printing to form a wet film with a size of 1 cm×1 cm on a glass substrate, and baked at 140° C. for 30 minutes to obtain a conductive film (26). The resistivity of the conductive film (26) was measured by a four-point probe resistance meter (LORESTA-AX, commercially available from Mitsubishi Chemical Co.), and the measurement results are shown in Table 4.

Example 27

60 parts by weight of the disulfide resin having at least one terminal reactive functional group (4), 2 parts by weight of silver powder having an average diameter of about 1.0 μm (S11000-10, commercially available from Ferro Japan), 8 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 30 parts by weight of silver nanowire having an average of diameter of 30 nm and an average length of 20 μm was then added to the mixture and then continuously stirred. Finally, the mixture was concentrated by rotary pump to obtain a conductive material composition (27). Subsequently, the dispersibility of the conductive material composition (27) was tested, and the test results are shown in Table 4.

Subsequently, the conductive material composition (27) was printed by screen printing to form a wet film with a size of 1 cm×1 cm on a glass substrate, and baked at 140° C. for 30 minutes to obtain a conductive film (27). The resistivity of the conductive film (27) was measured by a four-point probe resistance meter (LORESTA-AX, commercially available from Mitsubishi Chemical Co.), and the measurement results are shown in Table 4.

Example 28

Example 28 was similar to Example 27, and the difference in Example 28 was the disulfide resin having at least one terminal reactive functional group (4) being replaced with disulfide resin having at least one terminal reactive functional group (5) to obtain the conductive material composition (28). Subsequently, the dispersibility of the conductive material composition (28) was tested, and the test results are shown in Table 4. Subsequently, the conductive material composition (28) was printed by screen printing to form a wet film with a size of 1 cm×1 cm on a glass substrate, and baked at 140° C. for 30 minutes to obtain a conductive film (28). The resistivity of the conductive film (28) was measured by a four-point probe resistance meter (LORESTA-AX, commercially available from Mitsubishi Chemical Co.), and the measurement results are shown in Table 4.

Example 29

Example 29 was similar to Example 27, and the difference in Example 29 was the disulfide resin having at least one terminal reactive functional group (4) being replaced with disulfide resin having at least one terminal reactive functional group (7) to obtain the conductive material composition (29). Subsequently, the dispersibility of the conductive material composition (29) was tested, and the test results are shown in Table 4. Subsequently, the conductive material composition (29) was printed by screen printing to form a wet film with a size of 1 cm×1 cm on a glass substrate, and baked at 140° C. for 30 minutes to obtain a conductive film (29). The resistivity of the conductive film (29) was measured by a four-point probe resistance meter (LORESTA-AX, commercially available from Mitsubishi Chemical Co.), and the measurement results are shown in Table 4.

Example 30

Example 30 was similar to Example 27, and the difference in Example 30 was the disulfide resin having at least one terminal reactive functional group (4) being replaced with disulfide resin having at least one terminal reactive functional group (9) to obtain the conductive material composition (30). Subsequently, the dispersibility of the conductive material composition (30) was tested, and the test results are shown in Table 4. Subsequently, the conductive material composition (30) was printed by screen printing to form a wet film with a size of 1 cm×1 cm on a glass substrate, and baked at 140° C. for 30 minutes to obtain a conductive film (30). The resistivity of the conductive film (30) was measured by a four-point probe resistance meter (LORESTA-AX, commercially available from Mitsubishi Chemical Co.), and the measurement results are shown in Table 4.

TABLE 4

| | Disulfide resin having at least one terminal reactive functional group | S11000-10 (parts by weight) | FA-D-5 (parts by weight) | Silver nanowire (parts by weight) | Dispersibility test | Resistivity ($\Omega \cdot cm$) |
|---|---|---|---|---|---|---|
| Example 19 | Disulfide resin having at least one terminal reactive functional group (4) (40 parts by weight) | 11.4 | 45.6 | 3 | Pass | $8.54 \times 10^{-3}$ |
| Example 20 | Disulfide resin having at least one terminal reactive functional group (5) (40 parts by weight) | 11.4 | 45.6 | 3 | Pass | $6.15 \times 10^{-3}$ |
| Example 21 | Disulfide resin having at least one terminal reactive functional group (7) (40 parts by weight) | 11.4 | 45.6 | 3 | Pass | $6.76 \times 10^{-3}$ |
| Example 22 | Disulfide resin having at least one terminal reactive functional group (9) (40 parts by weight) | 11.4 | 45.6 | 3 | Pass | $7.34 \times 10^{-3}$ |
| Example 23 | Disulfide resin having at least one terminal reactive functional group (4) (80 parts by weight) | 1 | 4 | 15 | Pass | $7.62 \times 10^{-3}$ |
| Example 24 | Disulfide resin having at least one terminal reactive functional group (5) (80 parts by weight) | 1 | 4 | 15 | Pass | $8.41 \times 10^{-3}$ |
| Example 25 | Disulfide resin having at least one terminal reactive functional group (7) (80 parts by weight) | 1 | 4 | 15 | Pass | $7.96 \times 10^{-3}$ |
| Example 26 | Disulfide resin having at least one terminal reactive functional group (9) (80 parts by weight) | 1 | 4 | 15 | Pass | $8.79 \times 10^{-3}$ |
| Example 27 | Disulfide resin having at least one terminal reactive functional group (4) (60 parts by weight) | 2 | 8 | 30 | Pass | $4.28 \times 10^{-3}$ |
| Example 28 | Disulfide resin having at least one terminal reactive functional group (5) (60 parts by weight) | 2 | 8 | 30 | Pass | $5.83 \times 10^{-3}$ |
| Example 29 | Disulfide resin having at least one terminal reactive functional group (7) (60 parts by weight) | 2 | 8 | 30 | Pass | $4.67 \times 10^{-3}$ |
| Example 30 | Disulfide resin having at least one terminal reactive functional group (9) (60 parts by weight) | 2 | 8 | 30 | Pass | $5.42 \times 10^{-3}$ |

As shown in Table 4, in the conductive material compositions of Examples 19 to 22 (having relatively high amount of silver flake and relatively low amount of silver nanowire), the silver could be efficiently dispersed in the conductive material compositions, such that the conductive material compositions were evenly mixed and flowable. The conductive films in Examples 19 to 22 had conductivity (and resistivity of $6 \times 10^{-3}$ $\Omega \cdot cm$ to $9 \times 10^{-3}$ $\Omega \cdot cm$). In the conductive material compositions of Examples 23 to 26 (the disulfide resins having at least one terminal epoxy functional group or at least one terminal acrylate functional group was increased to 80 parts by weight), the silver could be efficiently dispersed in the conductive material compositions, such that the conductive material compositions were evenly mixed and flowable. The conductive films in Examples 23 to 26 had conductivity (and resistivity of $7 \times 10^{-3}$ $\Omega \cdot cm$ to $9 \times 10^{-3}$ $\Omega \cdot cm$). In the conductive material compositions of Examples 27 to 30 (having relatively high amount of silver nanowire), the silver could be efficiently dispersed in the conductive material compositions, such that the conductive material compositions were evenly mixed and flowable. The conductive films in Examples 27 to 30 had conductivity (and resistivity of 4×10⁻³ Ω·cm to 6×10⁻³ Ω·cm).

Example 31

60 parts by weight of the disulfide resin having at least one terminal reactive functional group (3), 17.5 parts by weight of silver powder having an average diameter of about 1.0 μm (S11000-10, commercially available from Ferro Japan), 17.5 parts by weight of silver flake (FA-D-5, commercially available from DOWA Electronics Materials Co., Ltd.), 3 parts by weight of initiator (SanAid® SI-60, commercially available from Sanshin Chemical Industry Co., Ltd.), and 50 parts by weight of dimethylacetamide (DMAc) were mixed. The mixture was then evenly dispersed by three rollers. 5 parts by weight of silver nanowire having an average of diameter of 30 nm and an average length of 20 μm was then added to the mixture and then continuously stirred. Finally, the mixture was concentrated by rotary pump to obtain a conductive material composition (31). Subsequently, the dispersibility of the conductive material composition (31) was tested, and the test results are shown in Table 5.

Subsequently, the conductive material composition (31) was printed by stencil printing to form a wet film with a size of 1 cm×5 cm on a thermoplastic polyurethanes (TPU) substrate, and baked at 140° C. for 30 minutes to obtain a conductive film (31). Subsequently, the resistance change rate of the conductive film (31) after being stretched to 120% and the resistance change rate of the conductive film (31) after being stretched to 150% were respectively tested, and the test results are shown in Table 5. The resistance change rate of the conductive film after being stretched to 120% was tested by following steps: the conductive film was stretched to 120% and then recovered for 500 cycles. Subsequently, the resistance change rate of the conductive film was measured (compared to the conductive film before being stretched). The resistance change rate of the conductive film after being stretched to 150% was tested by following steps: the conductive film was stretched to 150%, and the resistance change rate of the conductive film was measured (compared to the conductive film before being stretched).

Example 32

Example 32 was similar to Example 31, and the differences in Example 32 were S11000-10 being decreased from 17.5 parts by weight to 16 parts by weight, FA-D-5 being decreased from 17.5 parts by weight to 16 parts by weight, and the silver nanowire being increased from 5 parts by weight to 8 parts by weight to obtain the conductive material composition (32). Subsequently, the dispersibility of the conductive material composition (32) was tested, and the test results are shown in Table 5. Subsequently, the conductive material composition (32) was printed by stencil printing to form a wet film with a size of 1 cm×5 cm on a thermoplastic polyurethanes (TPU) substrate, and baked at 140° C. for 30 minutes to obtain a conductive film (32). Subsequently, the resistance change rate of the conductive film (32) after being stretched to 120% and the resistance change rate of the conductive film (32) after being stretched to 150% were tested, and the test results are shown in Table 5.

Example 33

Example 33 was similar to Example 31, and the differences in Example 32 were S11000-10 being decreased from 17.5 parts by weight to 15 parts by weight, FA-D-5 being decreased from 17.5 parts by weight to 15 parts by weight, and the silver nanowire being increased from 5 parts by weight to 10 parts by weight to obtain the conductive material composition (33). Subsequently, the dispersibility of the conductive material composition (33) was tested, and the test results are shown in Table 5. Subsequently, the conductive material composition (33) was printed by stencil printing to form a wet film with a size of 1 cm×5 cm on a thermoplastic polyurethanes (TPU) substrate, and baked at 140° C. for 30 minutes to obtain a conductive film (33). Subsequently, the resistance change rate of the conductive film (33) after being stretched to 120% and the resistance change rate of the conductive film (33) after being stretched to 150% were tested, and the test results are shown in Table 5.

Example 34

Example 34 was similar to Example 31, and the differences in Example 34 were S11000-10 being decreased from 17.5 parts by weight to 2.5 parts by weight, FA-D-5 being increased from 17.5 parts by weight to 30 parts by weight, and the silver nanowire being increased from 5 parts by weight to 10 parts by weight to obtain the conductive material composition (34). Subsequently, the dispersibility of the conductive material composition (34) was tested, and the test results are shown in Table 5. Subsequently, the conductive material composition (34) was printed by stencil printing to form a wet film with a size of 1 cm×5 cm on a thermoplastic polyurethanes (TPU) substrate, and baked at 140° C. for 30 minutes to obtain a conductive film (34). Subsequently, the resistance change rate of the conductive film (34) after being stretched to 120% and the resistance change rate of the conductive film (34) after being stretched to 150% were tested, and the test results are shown in Table 5.

Example 35

Example 35 was similar to Example 31, and the differences in Example 35 were the disulfide resin having at least one terminal reactive functional group (3) being increased from 60 parts by weigh to 80 parts by weight, S11000-10 being decreased from 17.5 parts by weight to 2.5 parts by weight, FA-D-5 being decreased from 17.5 parts by weight to 2.5 parts by weight, and the silver nanowire being increased from 5 parts by weight to 15 parts by weight to obtain the conductive material composition (35). Subsequently, the dispersibility of the conductive material composition (35) was tested, and the test results are shown in Table 5. Subsequently, the conductive material composition (35) was printed by stencil printing to form a wet film with a size of 1 cm×5 cm on a thermoplastic polyurethanes (TPU) substrate, and baked at 140° C. for 30 minutes to obtain a conductive film (35). Subsequently, the resistance change rate of the conductive film (35) after being stretched to 120% and the resistance change rate of the conductive film (35) after being stretched to 150% were tested, and the test results are shown in Table 5.

Example 36

Example 36 was similar to Example 31, and the differences in Example 36 were the disulfide resin having at least one terminal reactive functional group (3) being decreased from 60 parts by weigh to 40 parts by weight, S11000-10 being increased from 17.5 parts by weight to 28.5 parts by weight, FA-D-5 being increased from 17.5 parts by weight to 28.5 parts by weight, and the silver nanowire being decreased from 5 parts by weight to 3 parts by weight to obtain the conductive material composition (36). Subsequently, the dispersibility of the conductive material composition (36) was tested, and the test results are shown in Table 5. Subsequently, the conductive material composition (36) was printed by stencil printing to form a wet film with a size of 1 cm×5 cm on a thermoplastic polyurethanes (TPU) substrate, and baked at 140° C. for 30 minutes to obtain a conductive film (36). Subsequently, the resistance change rate of the conductive film (36) after being stretched to 120% and the resistance change rate of the conductive film (36) after being stretched to 150% were tested, and the test results are shown in Table 5.

thermoplastic polyurethanes (TPU) substrate, and baked at 140° C. for 30 minutes to obtain a film (7). Subsequently, the resistance change rate of the film (8) after being stretched to 120% and the resistance change rate of the film (7) after being stretched to 150% were tested, and the test results are shown in Table 6.

Comparative Example 8

4 parts by weight of cycloaliphatic epoxy resin monomer (YX8000, commercially available from Mitsubishi Chemical Corporation), 36 parts by weight of the polysulfide (Thiokol LP-55, commercially available from Toray Fine Chemicals Co., Ltd.), 28.5 parts by weight of silver powder having an average diameter of about 1.0 μm (S11000-10,

TABLE 5

| | Disulfide resin having at least one terminal reactive functional group (3) | S11000-10 (parts by weight) | FA-D-5 (parts by weight) | Silver nanowire (parts by weight) | Dispersibility test | Resistance change rate (stretched to 120%) | Resistance change rate (stretched to 150%) |
|---|---|---|---|---|---|---|---|
| Example 31 | 60 parts by weight | 17.5 | 17.5 | 5 | Pass | 18.69 | 22.27 |
| Example 32 | 60 parts by weight | 16 | 16 | 8 | Pass | 6.83 | 18.36 |
| Example 33 | 60 parts by weight | 15 | 15 | 10 | Pass | 5.19 | 15.03 |
| Example 34 | 60 parts by weight | 0 | 30 | 10 | Pass | 4.45 | 22.64 |
| Example 35 | 80 parts by weight | 2.5 | 2.5 | 15 | Pass | 2.42 | 4.28 |
| Example 36 | 40 parts by weight | 28.5 | 28.5 | 3 | Pass | 14.24 | 11.39 |

Comparative Example 7

8.1 parts by weight of cycloaliphatic epoxy resin monomer (YX8000, commercially available from Mitsubishi Chemical Corporation), 71.96 parts by weight of the polysulfide (Thiokol LP-55, commercially available from Toray Fine Chemicals Co., Ltd.), 2.5 parts by weight of silver powder having an average diameter of about 1.0 μm (S11000-10, commercially available from Ferro Japan), 2.5 parts by weight of silver flake (FA-D-5, commercially available from DOWA Electronics Materials Co., Ltd.), 3 parts by weight of initiator tetra-n-butylammonium fluoride (TBAF), and 50 parts by weight of dimethylacetamide (DMAc) were mixed. The mixture was then evenly dispersed by three rollers. 15 parts by weight of silver nanowire having an average of diameter of 30 nm and an average length of 20 μm was then added to the mixture and then continuously stirred. Finally, the mixture was concentrated by rotary pump to obtain a composition (7). Subsequently, the dispersibility of the composition (7) was tested, and the test results are shown in Table 6.

Subsequently, the composition (7) was printed by stencil printing to form a wet film with a size of 1 cm×5 cm on a commercially available from Ferro Japan), 28.5 parts by weight of silver flake (FA-D-5, commercially available from DOWA Electronics Materials Co., Ltd.), 3 parts by weight of initiator tetra-n-butylammonium fluoride (TBAF), and 50 parts by weight of dimethylacetamide (DMAc) were mixed. The mixture was then evenly dispersed by three rollers. 15 parts by weight of silver nanowire having an average of diameter of 30 nm and an average length of 20 μm was then added to the mixture and then continuously stirred. Finally, the mixture was concentrated by rotary pump to obtain a composition (8). Subsequently, the dispersibility of the composition (8) was tested, and the test results are shown in Table 6.

Subsequently, the composition (8) was printed by stencil printing to form a wet film with a size of 1 cm×5 cm on a thermoplastic polyurethanes (TPU) substrate, and baked at 140° C. for 30 minutes to obtain a film (8). Subsequently, the resistance change rate of the film (8) after being stretched to 120% and the resistance change rate of the film (8) after being stretched to 150% were tested, and the test results are shown in Table 6.

TABLE 6

| | Monomer having reactive functional group/resin | Polysulfide | S11000-10 (parts by weight) | FA-D-5 (parts by weight) | Silver nanowire (parts by weight) | Dispersibility test | Resistance change rate (stretched to 120%) | Resistance change rate (stretched to 150%) |
|---|---|---|---|---|---|---|---|---|
| Comparative Example 7 | YX8000 (8.1 parts by weight) | LP-55 (71.96 parts by weight) | 2.5 | 2.5 | 15 | Pass | Not conductive | |

TABLE 6-continued

| | Monomer having reactive functional group/resin | Polysulfide | S11000-10 (parts by weight) | FA-D-5 (parts by weight) | Silver nanowire (parts by weight) | Dispersibility test | Resistance change rate (stretched to 120%) | Resistance change rate (stretched to 150%) |
|---|---|---|---|---|---|---|---|---|
| Comparative Example 8 | YX8000 (4 parts by weight) | LP-55 (36 parts by weight) | 28.5 | 28.5 | 3 | Pass | Not conductive | |

As shown in Table 5, when the ratio of the resin and the silver (silver powder and silver flake) was same, increasing the silver nanowire amount could obtain a conductive film having a lower resistance change rate after being stretched to 120% or 150%. Moreover, adding silver nanowire could obtain a conductive film having a lower resistance change rate after being stretched to 120% or 150% compared to adding silver flake (Examples 34 and 36), as shown in Table 5. Because Comparative Examples 7 and 8 utilized the non-modified polysulfide rather than the disulfide resin having at least one terminal epoxy functional group or at least one terminal acrylate functional group to prepare the compositions, the compositions in Examples 7 and 8 cured on TPU (and after being stretched) were not conductive.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A conductive material composition, comprising:
   40 to 80 parts by weight of disulfide resin having at least one terminal reactive functional group, wherein the terminal reactive functional group is acrylate group, methacrylate group, glycidyl group, oxiranyl group, oxetanyl group, or 3,4-epoxycyclohexyl group, wherein the disulfide resin having at least one terminal reactive functional group is a product of reacting disulfide mercaptan and acrylate compound, wherein the acrylate compound includes a first compound, wherein the first compound is (3-ethyl-3-oxetanyl)methyl methacrylate, 3,4-epoxycyclohexylmethyl acrylate, glycidyl methacrylate, glycidyl acrylate, or a combination thereof; and
   20 to 60 parts by weight of metal material, wherein the metal material includes a one-dimensional metal material.

2. The conductive material composition as claimed in claim 1, wherein the disulfide mercaptan has a chemical formula of Formula (I):

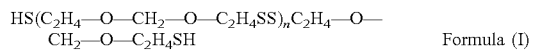

Formula (I)

wherein n is an integer of 1 to 200.

3. The conductive material composition as claimed in claim 1, wherein the acrylate compound further comprises a second compound, wherein the second compound is free of glycidyl group, oxiranyl group, oxetanyl group, or 3,4-epoxycyclohexyl group.

4. The conductive material composition as claimed in claim 3, wherein the second compound is methoxy polyethylene glycol monoacrylate, methoxy polyethylene glycol monomethacrylate, alkoxylated lauryl acrylate, tetrahydrofurfuryl acrylate, tetrahydrofurfuryl methacrylate, lauryl methacrylate, lauryl acrylate, 2-(2-ethoxyethoxy) ethyl acrylate), stearyl methacrylate, stearyl acrylate, isodecyl acrylate, isodecyl acrylate, 2-phenoxyethyl acrylate, 2-phenoxyethyl methacrylate, trimethylcyclohexyl methacrylate, trimethylcyclohexyl acrylate, isobornyl methacrylate, isobornyl acrylate, tridecyl acrylate, tridecyl methacrylate, ethoxylated nonyl phenol acrylate, octyldecyl acrylate, octyldecyl acrylate, cyclic trimethylolpropane formal acrylate, 2-hydroxyethyl acrylate, 2-hydroxyethyl methacrylate, ethylhexyl acrylate, ethylhexyl acrylate, or a combination thereof.

5. The conductive material composition as claimed in claim 1, further comprising:
   a third compound, wherein the third compound is a monomer having at least one reactive functional group, epoxy resin having at least one reactive functional group, oxetanyl resin having at least one reactive functional group, acrylate resin having at least one reactive functional group, methacrylate resin having at least one reactive functional group, or a combination thereof, wherein the reactive functional group is acrylate group, methacrylate group, glycidyl group, oxiranyl group, oxetanyl group, or 3,4-epoxycyclohexyl group.

6. The conductive material composition as claimed in claim 5, wherein the third compound and the disulfide resin having at least one terminal reactive functional group have a weight ratio of 1:99 to 1:1.

7. The conductive material composition as claimed in claim 1, wherein the metal material comprises titanium, iron, cobalt, nickel, platinum, copper, silver, gold, zinc, aluminum, indium, tin, an alloy thereof, or a composite thereof.

8. The conductive material composition as claimed in claim 1, wherein the one-dimensional metal material is metal rod, metal wire, metal ribbon, metal tube, metal tip, metal pillar, metal fiber, or a combination thereof.

9. The conductive material composition as claimed in claim 1, wherein the metal material further includes a two-dimensional metal material, a three-dimensional metal material, or a combination thereof.

10. The conductive material composition as claimed in claim 9, wherein the one-dimensional metal material and the metal material have a weight ratio of 1:99 to 99:1.

11. The conductive material composition as claimed in claim 1, wherein the one-dimensional metal material is metal wire, and the metal wire has a diameter of 20 nm to 200 nm and a length of 5 μm to 300 μm.

12. The conductive material composition as claimed in claim 1, further comprising:
    an additive, and the additional amount of additive is 0.1 wt % to 10 w t% on the basis of the total weight of the disulfide resin having at least one terminal reactive functional group and the metal material.

13. The conductive material composition as claimed in claim 12, wherein the additive is initiator, hardener, leveling agent, filler, colorant, defoamer, flame retardant, or a combination thereof.

14. A conductive material, being a curing product of the conductive material composition as claimed in claim 1.

* * * * *